United States Patent
Rash et al.

(10) Patent No.: US 9,210,126 B2
(45) Date of Patent: Dec. 8, 2015

(54) METHOD FOR SECURE SINGLE-PACKET AUTHORIZATION WITHIN CLOUD COMPUTING NETWORKS

(71) Applicants: Michael B. Rash, Mount Airy, MD (US); Damien S. Stuart, Edgewater, MD (US)

(72) Inventors: Michael B. Rash, Mount Airy, MD (US); Damien S. Stuart, Edgewater, MD (US)

( * ) Notice: Subject to any disclaimer, the term of this patent is extended or adjusted under 35 U.S.C. 154(b) by 199 days.

(21) Appl. No.: 13/855,662

(22) Filed: Apr. 2, 2013

(65) Prior Publication Data

US 2013/0298218 A1 Nov. 7, 2013

Related U.S. Application Data

(63) Continuation of application No. 11/726,518, filed on Mar. 22, 2007, now Pat. No. 8,413,248.

(60) Provisional application No. 60/784,701, filed on Mar. 22, 2006.

(51) Int. Cl.
*H04L 29/06* (2006.01)
*G06F 21/55* (2013.01)

(52) U.S. Cl.
CPC .............. *H04L 63/02* (2013.01); *G06F 21/552* (2013.01); *H04L 63/10* (2013.01); *H04L 63/12* (2013.01); *G06F 2221/2101* (2013.01); *G06F 2221/2107* (2013.01); *G06F 2221/2119* (2013.01); *G06F 2221/2151* (2013.01)

(58) Field of Classification Search
USPC .......................................................... 726/11
See application file for complete search history.

(56) References Cited

U.S. PATENT DOCUMENTS

| | | | | |
|---|---|---|---|---|
| 8,042,147 B2 * | 10/2011 | Byres et al. | ........................ | 726/1 |
| 8,438,654 B1 * | 5/2013 | von Eicken et al. | ............ | 726/27 |
| 8,495,710 B2 * | 7/2013 | Barnes et al. | ...................... | 726/4 |
| 2002/0152325 A1 * | 10/2002 | Elgebaly et al. | .............. | 709/246 |
| 2003/0140248 A1 | 7/2003 | Izatt et al. | | |
| 2004/0260763 A1 * | 12/2004 | Bhattacharya et al. | ........ | 709/202 |
| 2005/0021727 A1 * | 1/2005 | Matsunami et al. | .......... | 709/223 |
| 2005/0182968 A1 | 8/2005 | Izatt et al. | | |
| 2005/0240994 A1 | 10/2005 | Burcham | | |

(Continued)

OTHER PUBLICATIONS

Krzywinski, M., Port Knocking: Network Authentication Across Closed Ports, SysAdmin Magazine 12: 12-17; 2003.

*Primary Examiner* — Taghi Arani
*Assistant Examiner* — Phy Anh Vu
(74) *Attorney, Agent, or Firm* — Ober, Kaler, Grimes & Shriver; Royal W. Craig

(57) ABSTRACT

A method for secure single-packet authorization and secure transparent access to software services residing on cloud-based servers other than the host system where the SPA server itself is running. A single packet authorization (SPA) server running on a host system passively monitors a network for a valid SPA packet while maintaining a default deny stance on a gateway packet filter. The SPA server stores the MD5 sum of every valid SPA packet that it monitors and flags any duplicate access attempts. This way, if any SPA packet has the same MD5 hash as a previously monitored packet the SPA server treats the packet as malicious. After a valid SPA packet is sent, the SPA host server provides a Network Address Translation (NAT) which essentially creates an "SPA gateway" within a Cloud network independent of any other border gateway devices that already exist within the Cloud. The client system may then request access via the SPA gateway to services that are on other Cloud systems besides the one where the SPA server is running.

1 Claim, 1 Drawing Sheet

(56) References Cited

U.S. PATENT DOCUMENTS

| | | | |
|---|---|---|---|
| 2005/0246524 A1* | 11/2005 | Brownell et al. | 713/156 |
| 2011/0107410 A1* | 5/2011 | Dargis | 726/9 |
| 2013/0111540 A1* | 5/2013 | Sabin | 726/1 |
| 2013/0227634 A1* | 8/2013 | Pal et al. | 726/1 |
| 2013/0332917 A1* | 12/2013 | Gaither et al. | 717/170 |

* cited by examiner

METHOD FOR SECURE SINGLE-PACKET AUTHORIZATION WITHIN CLOUD COMPUTING NETWORKS

CROSS-REFERENCE TO RELATED APPLICATION(S)

The present application is a continuation-in-part of U.S. application Ser. No. 11/726,518 filed 22 Mar. 2007, which in turn derives priority from U.S. Provisional Application No. 60/784,701 filed Mar. 22, 2006.

BACKGROUND OF THE INVENTION (1) Field of the Invention

The present invention relates to distributed information protection and network security and, more particularly, to an enhanced method for secure single-packet remote authorization using a daemon that passively monitors a network for a specially constructed encrypted packet and anonymously accepts or rejects subsequent connection attempts based on the characteristics of said packet.

(2) Description of Prior Art

Network technology is invaluable for sharing resources. However, connecting a computer or network to the Internet is a risky proposition. There is a high probability that eventually, someone will gain unauthorized access. To exploit a server-side application vulnerability, an intruder needs to gain access to an open port leading into the system, or trick the host system into opening one (through shellcode that exploits a software vulnerability and opens a backdoor into the system for example). This requires a combination of the host system's unique IP (Internet protocol) address, and the ability to talk to the server's TCP (Transmission Protocol) or UDP (User Datagram Protocol) stack and corresponding ports that serve as the door into the host system.

Firewalls help to prevent the ability of attackers to exploit software vulnerabilities through the use of port and protocol filtering to minimize server access from arbitrary IP addresses, and also through the use of NAT (network address translation) for protected internal hosts. Unfortunately, conventional firewalls operate under a fixed ruleset which, if predicted or examined through various scanning methods, can offer little protection for vulnerable services. Consequently, a variety of more robust authorization techniques have evolved to increase security.

For example, U.S. Patent Application Nos. 20050182968 and 20030140248 both by Izatt et al. show an "Intelligent firewall" that analyzes incoming packets to determine whether or not they are acceptable to forward on to a destination in the network. If the packet is not acceptable, access to the network is denied and the packet is dropped with no denial of access message being sent to the source of the packet. As a result, there is no detectable response to the sender of denied access from the firewall.

United States Patent Application 20050240994 by Burcham published Oct. 27, 2005 shows a method for maintaining network access and security that uses a perimeter client and a perimeter server.

"Port knocking" is a method of externally opening ports on a firewall by generating a connection attempt on a set of prespecified closed ports. Once a correct sequence of connection attempts is received the firewall rules are dynamically changed to allow the computer that sent the connection attempts to connect over specified port(s). Port knocking is typically implemented by a daemon (a computer program that rims in the background) that watches the firewall log file for connection attempts and that modifies the firewall configuration accordingly. The port knock sequence itself is a secret handshake comprising any number of TCP, UDP packets to numbered ports on the host system. The complexity of the knock can be anything from a simple ordered list of ports to a complex time-dependent, source-IP-based encrypted string. The portknock daemon listens for knocks on certain ports (either via the firewall log or by packet capture) and allows access accordingly. When the concept of port knocking was announced in 2003 (Krzywinski, M., Port Knocking: Network Authentication Across Closed Ports, SysAdmin Magazine 12: 12-17; 2003), many competing implementations were rapidly developed. There are now over 30 different software projects dedicated to various implementations of port knocking. The two most important characteristics of port knocking in terms of enhancing security are: 1) the passive communication of authentication information from a remote system to the host system, with no return of data (anyone who casually scans the target system will not be able to tell that there is any server listening on the ports protected by the knock server); and 2) the server side use of a packet filter to intercept all attempts to connect with the server that are not associated with a valid port, knocking sequence. Consequently, even if an attacker possesses the host system's IP address, TCP and UDP ports that serve as the door to the host system are completely inaccessible without first issuing a valid knock sequence.

The present inventor has implemented an open-source daemon called fwknop (Firewall Knock Operator), which supports an entirely new mechanism for network authentication and authorization called Single Packet Authorization that requires only a single encrypted packet in order to gain access to protected services. This new mechanism offers many advantages over both shared and encrypted port knock sequences as discussed below.

Unfortunately, port knocking is not designed to provide bullet-proof security, and, indeed, replay attacks can easily be leveraged against a port knock server in an effort to masquerade as a legitimate client. Moreover, in port knocking schemes the communication of information within packet headers as opposed to the packet payload severely limits the amount of data that can effectively be transferred. The port fields of the TCP and UDP headers are 16 bits wide, so only two bytes of information can be transferred per packet in a traditional port knock sequence. This assumes that other fields within the packet header are not also made significant in terms of the knock sequence, but any conceivable implementation would not be able to transmit nearly as much information as a protocol that makes use of payload data. If only two bytes of information were all that were required to communicate the desired access to a portknock daemon then this would not be a significant issue, but it is not enough to simply create a mapping between a knock sequence (however short) and opening a port. An encryption algorithm can help, but even a symmetric block cipher with a reasonable key size of, say, 128 bits forces at least 8 packets to be sent at two bytes per packet. As soon as multiple packets become involved, we need to try to ensure that the packets arrive in order. This implies that a time delay is added between each successive packet in the knock sequence. Simply blasting the packets onto the network as quickly as possible might result in out of order delivery by the time the packets reach their intended target. Because the knock server is strictly passively monitoring packets and consequently has no notion of a packet acknowledgment scheme (such as built into the Transmission Control Protocol), a reasonable time delay is on the order of about a half second. Given a minimum of 8 packets to send, we are up to four seconds just to communicate the knock sequence. In addition, if there were ever a need to send more information, say on the order of 100 bytes, the time to send would be longer than most people would be willing to wait.

Unfortunately, under current port-knocking schemes, a consequence of sending multiple packets in a slow sequence is that it becomes trivial for an attacker to break any sequence as it is being sent by the port knocking client. All the attacker needs to do is to spoof a duplicate packet from the source address of the client as a knock while the sequence is in progress. This duplicate packet would be interpreted by the knock server as part of the sequence, and hence breaking the original sequence. There is existing software (programs like hping available at http://www.hping.org) that makes it exceedingly easy to spoof IP packets from arbitrary IP addresses. It is not enough just to encrypt knock sequences as encryption can be deciphered as well.

There are no traditional port knocking methods that elegantly prevent replay attacks, though some make it difficult (such as altering knock sequences based upon time, iterating a hashing function as in the S/KEY system, or even manually changing the agreed upon encryption key for each successful knock sequence). However, each of these known methods requires keeping state at both the client and the server, and does not scale well once lots of users become involved. However, in applicant's co-pending application Ser. No. 11/726,518 filed 22 Mar. 2007 he describes an authentication and authorization scheme employing Single Packet Authorization that does not suffer from this type of easy injection attack. This approach relies on a single packet authorization (SPA) server on a host system to passively monitor the network for connection attempts and an SPA client on a client system that is responsible for generating the appropriately encrypted SPA packet in order to gain access to services on the host. The SPA host server anonymously accepts or rejects those attempts depending on whether a valid SPA packet is detected. A particular packet format is sent from the SPA client to the SPA host to gain access. The format is encrypted and non-replayable by virtue of 16 bytes of random data in every message, and an MD5 sum that is a hash function of the random data (made via any known hashing function). The SPA server stores the MD5 sum of every valid SPA packet that it monitors. This makes it possible for the SPA server to know which messages have been sent before. The SPA Server does not honor those that are duplicates of previous messages, but rather flags any duplicate access attempts using the same MD5 hash as a previously monitored packet, in which case the SPA server treats the packet as being generated by a malicious attempt to replay the original packet and rejects it. The foregoing software method effectively prevents attackers from replaying captured messages against an SPA host server in a client-server architecture, but is unsuited for use in a Cloud Computing network when NAT access is needed through the SPA server system to a separate internal Cloud system on non-routable IP space. Such access is advantageous in some cases in Cloud computing networks that follow the Infrastructure as a Service (IaaS) model and that only enable limited rentable IP addresses to be bound to cloud-resident hosts.

The present application discloses an enhanced version of Single Packet Authorization that is meant to provide transparent access to software services that reside on cloud-based servers, other than the host system where the SPA server itself is running.

SUMMARY OF THE INVENTION

It is therefore, an object of this invention to provide a method for secure single-packet authorization remote authorization within cloud computing networks.

It is another object to provide secure transparent access to software services residing on cloud-based servers other than the host system where the SPA server itself is running.

It is another object to provide the ability for the SPA server to dynamically reconfigure the local packet filter to grant temporary access to a remote service via a Network Address Translation (NAT), not just to a local service as was the case in applicant's co-pending application Ser. No. 11/726,518.

These and other objects are accomplished herein by an enhanced method of Single Packet Authorization that provides transparent access to software services resident on cloud-based servers, other than the host system where the SPA server itself is running.

As in applicant's co-pending application Ser. No. 11/726, 518 filed 22 Mar. 2007, an SPA client on a client system issues a specially-formatted SPA packet that is encrypted and non-replayable. An SPA client running on a client system is responsible for generating the appropriately encrypted SPA packet to the host system using a particular packet format. The packet format is encrypted and non-replayable. Specifically, each SPA packet includes 16 bytes of random data in every message, and an MD5 sum that is a hash function of the random data (made via any known hashing function). The MD5 sum is calculated over the entire message and then used by the SPA server to verify message integrity after a successful message decrypt. Only a single packet needs to be sent (rather than continuous port-knocking), and the SPA packet cannot be modified en-route, duplicated, or replayed by a malicious third party, thereby thwarting replay attacks.

A single packet authorization (SPA) server running on a host system passively monitors a network for a valid SPA packet while maintaining a default deny stance on a gateway packet filter. The SPA server stores the MD5 sum of every valid SPA packet that it monitors and flags any duplicate access attempts. This way, if any SPA packet has the same MD5 hash as a previously monitored packet, then the SPA server treats the packet as being generated by a malicious attempt to replay the original packet against the server in an effort to gain the same access. After a valid SPA packet is sent, the SPA host server provides a Network Address Translation (NAT) which essentially creates an "SPA gateway" within a Cloud network that is independent of any other border gateway devices that already exist within the Cloud provider itself. The client system may then access services that reside on other internal Cloud hosts through the SPA gateway transparently.

Other variations and advantages are described in the detailed description below.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

Figures 1, 2:
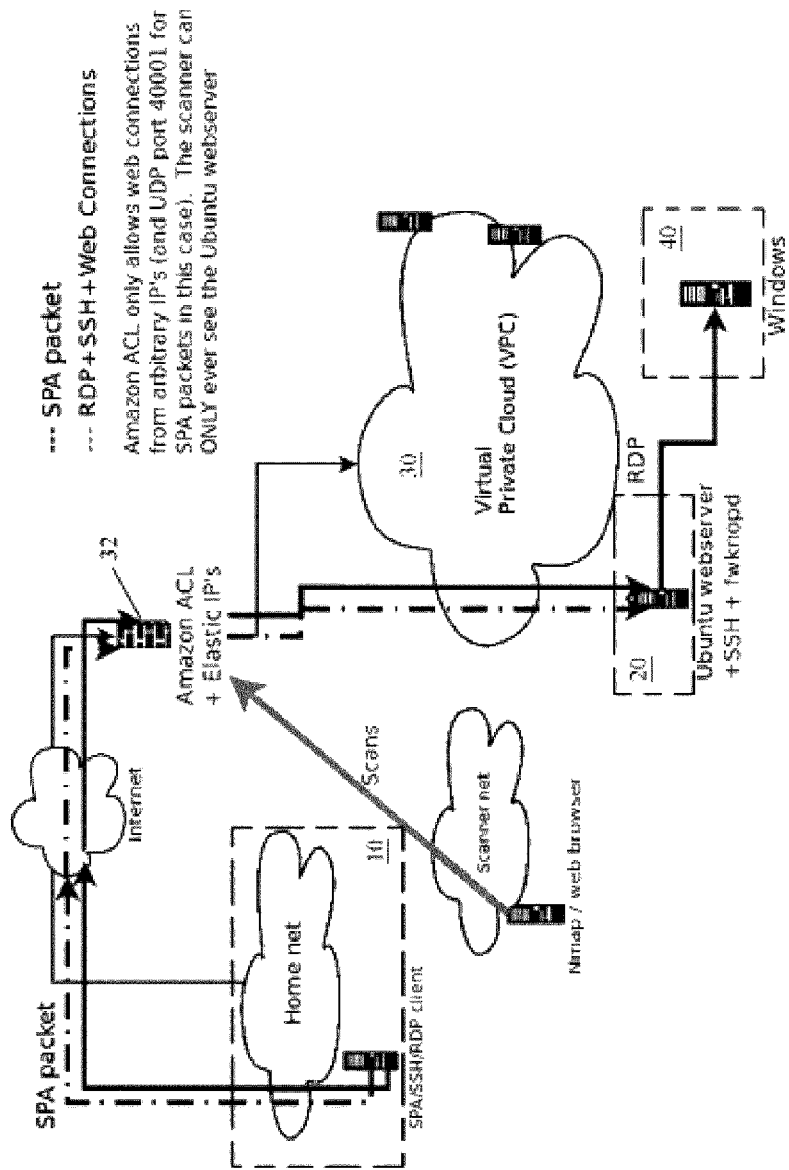
FIG. 1 shows a basic network diagram of the present system.
FIG. 2 illustrates the Single Packet Authorization Message Format.

The present invention is an enhanced method of Single Packet Authorization that provides transparent access to software services resident on cloud-based servers, other than the host system where the SPA server itself is running.

FIG. 1 shows a basic network diagram of the present system, which generally includes an SPA client server that is running on client system 10, a Cloud network 30 (for example, Amazon® Web Services), and an SPA host server that is running on host system 20 within the Cloud network 30. In addition, a Windows®-based host 40 also resides within the Cloud and host 40 is running a Remote Desktop Protocol (RDP) service. The SPA host server running on host system 20 is used to gain access from the SPA client system 10 to the RDP service on host 40 through the SPA gateway on host system 20 with the dynamic creation of suitable NAT firewall rules.

The single packet authorization (SPA) server on host system 20 passively monitors for connection attempts and anonymously accept or rejects said attempts. The SPA client on a client system 10 is responsible for generating the appropriately encrypted SPA packet in order to gain access to Cloud services. The packet format is encrypted with either a symmetric or asymmetric encryption algorithm, and non-replayable by virtue of comparison of MD5 hash values of previously communicated SPA packets. The SPA client on client system 10 and SPA server on host system 20 are components of a firewall knock operator, and are preferably existing software components herein identified as fwknop ("FireWall Knock Operator"), which is programmed to implement the present method. However, one skilled in the art should understand that other existing firewall knock operators may be programmable in a like manner to serve equally well. There are two major components to fwknop: an authenticating Ethernet sniffer (fwknopd server) on the host system 20 that is responsible for modifying a packet filter that has been configured in a default-drop stance for all protected services, and an SPA client (fwknop client) on the client system 10 that is responsible for generating the appropriately encrypted SPA packet in order to gain access to services protected by fwknopd.

As seen in FIG. 1, the SPA server 20 may be a web-enabled computer server running Ubuntu™ computer operating system, a Secure Shell (SSH) server component for securely accessing one computer from another (the Linux SSH server maintained by the OpenSSH project is well-suited), and an fwknopd server component. The SPA server 20 is programmed to allow access to a specified port by a specified username once a valid SPA message is monitored. The fwknopd component of SPA server 20 is programmed to accept each valid SPA message only once (hence "non-repeatability"). Thus, in order for an fwknop SPA server 20 to authenticate and allow the subsequent authorization criteria to be applied, several pieces of information must be securely communicated to the fwknopd SPA server 20 through the internet and Cloud network 30 firewall and router Access Control List (ACL) 32.

Thus, the present method requires a specific Fwknop Single Packet Authorization Message Format (described below). Several other software components are also required. Specifically, the method contemplates an existing Cloud firewall 32, and requires any commercial or non-commercial packet filtering architecture as well as a packet capture library such as libpcap, at the SPA server 20. Netfilter is an existing open-source packet filtering framework inside the Linux kernel series which enables packet filtering, network address and port translation and other packet manipulation, and the fwknop implementation currently supports Netfilter. Netfilter comprises a set of hooks inside the Linux kernel that allows kernel modules to register callback functions with the network stack. A registered callback function is then called back for every packet that traverses the respective hook within the network stack. Libpcap is a library of code that provides a high level interface to allow packet capture. Generally, libpcap implements a virtual device from which captured packets are read from userspace applications. This allows a packet filtering mechanism for use as a network traffic analyzer.

The present SPA server 20 system employs Netfilter to intercept (hook) packets within the kernel, which are then analyzed and screened using libpcap. Thus, anyone scanning for a service protected by this method cannot even talk directly to the IP stack without being authorized. In accordance with the present invention, Netfilter is set to maintain a "default drop" stance in order to protect services (such as OpenSSH) with an additional layer of security, thereby making the exploitation of vulnerabilities much more difficult. The fwknop server component at SPA server 20 passively monitors authorization packets via libcap and hence there is no "server" to which to connect in the traditional sense. Access to a protected service is only granted after a valid encrypted and non-replayed packet is monitored.

On the client 10 side, the fwknop component may be used to generate encrypted and non-replayable IP packets that will be authenticated (both symmetric and asymmetric encryption algorithms are supported) and tested for authorization (by comparison of username and cryptographically strong signatures against required Access Control Lists) in order to gain access through to a protected service. In order for an fwknop SPA client 10 to authenticate and allow the subsequent authorization criteria to be applied, several pieces of information must be securely communicated to the fwknopd SPA server 20. Thus, the present method requires a specific Fwknop Single Packet Authorization Message Format by which a client transmits the following within each SPA message:

- 16 bytes of random data
- local username
- local timestamp
- fwknop version
- mode (access or command)
- desired access (or command string)
- MD5 sum FIG. 2 illustrates the Single Packet Authorization Message Format.

The 16 bytes of random data ensures that each SPA message has a extremely high probability of being unique and hence allows the fwknopd server 20 to maintain a cache of previously seen messages in order to thwart replay attacks.

The local username enables the fwknop server to distinguish between individual users so that different levels of access can be granted on a per username basis.

The version number allows the fwknop message format to be extended while preserving backwards compatibility for older versions of the software.

The mode value instructs the server that the client either wishes to gain access to a service or run a command, each of which is specified in the next field.

The MD5 sum is calculated over the entire message and then used by the server 20 to verify message integrity after a successful message decrypt.

Each of the above values are concatenated together with ":" characters (with base64 encoding applied where necessary so as to not bust the field separation convention) and then the entire message is encrypted, either by symmetric or asymmetric encryption schemes (preferably Rijndael or GnuPG respectively). The ciphering requires sharing of a key up to 128 bits (symmetric) or 2048 bytes (asymmetric) in length between the fwknop SPA client 10 and the fwknopd SPA server 20.

To illustrate the usage of fwknop in the default Single Packet Authorization mode to protect and gain access, we configure the fwknop server 20 to allow NAT access to the RDP service on the Windows host 40 through the fwknopd server system (using standard iptables NAT rules once a valid SPA packet is monitored). This first entails the definition of an fwknopd server configuration file. In the present example both symmetric and asymmetric encryption schemes (Rijndael and GnuPG respectively) will be shown, and so configuration directives that enable an fwknop client to utilize either encryption scheme. The fwknop access configuration file "access.conf" for present purposes is shown below.

```
SOURCE: ANY;
DATA_COLLECT_MODE: PCAP;
OPEN_PORTS: tcp/3389;
PERMIT_CLIENT_PORTS: Y;
KEY: demokey1;
GPG_HOME_DIR: /root/.gnupg;
GPG_DECRYPT_ID: 706FBFDD;
GPG_DECRYPT_PW: decryptgpgpw;
GPG_REMOTE_ID: A742839F;
FW_ACCESS_TIMEOUT: 10;
REQUIRE_USERNAME: mbr;
ENABLE_FORWARDING: Y;
```

Normally, this file is placed at the location /etc/fwknop/access.conf in the filesystem on the host system 20 where fwknopd runs. The SOURCE variable describes the IP addresses and/or networks from which SPA packets may be issued (the "ANY" value is a wildcard that allows an SPA packet to be generated from any IP or network). The DATA_COLLECT_MODE variable informs fwknopd that SPA packets are to be collected via libpcap by sniffing the wire directly instead of monitoring a file that is written to by a separate sniffer process or by the Netfilter ulogd pcap writer. The OPEN_PORTS variable defines which specific ports will be opened in the Netfilter policy after receiving a valid SPA packet. The PERMIT_CLIENT_PORTS variable instructs the fwknopd server to open all TCP and/or UDP ports that are specified by the client in the (encrypted) SPA packet. The KEY variable is most important for the symmetric Rijndael encryption algorithm since it defines the shared key between the fwknop client and fwknopd server. On the client 10 side, the user is prompted to enter the shared key before the SPA packet is encrypted and sent on the wire. All variables that begin with "GPG_" describe some aspect of using GnuPG (see: http://www.gnupg.org) as the encryption mechanism for SPA communications. The GPG_HOME_DIR variable defines the filesystem path to the GnuPG directory where the fwknopd server key is stored. The GPG_DECRYPT_ID variable defines the key ID of the server public key that will be used by the fwknop client 20, and the GPG_DECRYPT_PW variable defines the password associated with the server key (the fwknopd process must be able to decrypt SPA packets on the fly as they are sniffed off the wire). The GPG_REMOTE_ID defines the key ID of the client key that must be used to cryptographically sign the SPA message. Note that GnuPG keys must be generated on both the client and server side for the SPA communication, and each of these keys must be imported (and signed) into the key ring on the opposite side (i.e. server to client and vice versa).

The FW_ACCESS_TIMEOUT variable specifies how long the packet filter will be configured to allow the IP address specified within the SPA packet to access the desired services. The REQUIRE_USERNAME variable describes the username that must be executing the fwknop client process on the client operating system (note that this is not cryptographically strong, but it is an additional layer of security). One important note is that while the FW_ACCESS_TIMEOUT variable is used to define the amount of time (in seconds) that the packet filter controlled by fwknopd will allow connections to be established with a protected service, the removal of the rule in the packet filter that grants access to the service does not necessarily remove all access. The packet filter may employ a connection tracking mechanism that will allow all packets associated with any TCP session that is established during the access window defined by the FW_ACCESS_TIMEOUT value to continue even after the window is passed. This is an advantage because communication over long running protocols (such as SSH or RDP for example) can be maintained, but all other attempts to establish a TCP session with the protected service will fail unless a valid SPA packet is monitored by fwknopd. The ENABLE_FORWARDING variable tells the fwknopd daemon that SPA-authenticated incoming connections are to be transparently NAT'd to any requested internal system (the Windows RDP service in our case).

The following example command executions illustrate the Single Packet Authorization scheme according to the present invention in operation from both the client 10 and host 20 perspectives. Because fwknop currently supports the Netfilter firewalling architecture in the Linux kernel, all command output below is collected from Linux systems, but the technique is equally applicable to other firewall architectures such as Check Point FW-1, NetScreen, and Cisco PIX. Note that at the beginning of each command, there is either the string "client" or "server". These strings are included in order to inform the reader about where the command is being executed (either on the client system 10 to generate the SPA packet, or on the server system 20 to monitor how the packet filter policy is modified, etc).

First, we login to the host system 20 and start fwknopd SPA server by using the standard initialization script (requires root access):

```
[server]# /etc/int.d/fwknop start
 * Starting fwknop ... [ok]
```

Now, we look at the messages that are written to syslog by fwknopd in order to verify that everything is functioning correctly and fwknopd is ready to accept SPA packets:

```
# tail -n 20 /var/log/messages | grep fwknopd
Jan 24 18:47:50 server fwknopd: starting fwknopd
Jan 24 18:47:50 server fwknopd: flushing existing Netfilter
IPT_AUTO_CHAIN chains
Jan 24 18:47:50 server fwknopd: imported p0f-based passive OS
fingerprinting signatures
Jan 24 18:47:51 server fwknopd: imported port knocking access
directives (1 SOURCE definitions).
Jan 24 18:47:51 server fwknopd: imported previous md5 sums from disk
cache: /var/log/fwknop/md5sums
```

The packet filter (Netfilter in our case) on the host system has not yet been configured in default-drop mode (to block all SSH and RDP connections), so we do that now for both local connections to SSH and any that may be forwarded via the FORWARD chain and corresponding NAT rules, and also add a state rule to allow established TCP connections to remain active:

```
#iptables -I INPUT 1 -p tcp --dport 22 -j DROP
#iptalbes -I INPUT 1 -p tcp --dport 3389 -j DROP
#iptables -I INPUT 1 -p tcp -m state --state
ESATABLISHED,RELATED -j
ACCEPT
#iptables -I FORWARD 1 -p tcp --dport 22 -j DROP
#iptables -I FORWARD 1 -p tcp --dport 3389 -j DROP
#iptables -I FORWARD 1 -p tcp -m state --state
ESATABLISHED,RELATED -j
ACCEPT
```

Next, on the client 10 side, it can be demonstrated using existing software such as Nmap that there is no prior access to any SSH server on the fwknopd firewall or RDP service through the fwknopd firewall (there should only be access after sending a proper SPA packet), Nmap ("Network Mapper") is a free open source utility for network exploration or security auditing, Nmap uses raw IP packets to determine what hosts are available on the network, what services (application name and version) those hosts are offering, what operating systems (and OS versions) they are running, what type of packet filters/firewalls are in use, and other characteristics. In the following Nmap output, we clearly see that the sshd port, TCP port 22, is "filtered" which means Nmap could not tell if it is open or closed.

```
[client]# nmap -P0 -p 22,3389 server
Starting nmap 3.83.DC13 ( http://www.insecure.org/nmap/ ) at 2006-01-24 18:50 EST
Interesting ports on server (10.10.10.1):
PORT STATE SERVICE
22/tcp filtered ssh
3389/tcp filtered rdp
Nmap finished: 1 IP address (1 host up) scanned in 2.100 seconds
```

This indicates that indeed the packet filter has been properly configured to disallow all access to SSHD and RDP since not even a TCP connection can be established. At this point, the packet filter on the server 10 is properly configured (there is no access from the client 10 system), and fwknopd is running and sniffing the connection for SPA packets. We are ready to now generate the SPA packet against the fwknopd server in an effort to gain access to RDP on the Windows host via NAT rules that fwknopd creates.

To generate a packet pursuant to the Single Packet Authorization Message Format of the present invention, we startup the fwknop client first in, for example, symmetric encryption mode. The user will be prompted for an encryption key, and must type in the same key that is listed in the KEY variable in the fwknopd access.conf file described above. The dialog for this is as follows, where "192.168.10.1" is the non-routeable IP of the Windows host within the Cloud network:

```
[client]$ fwknop -A tcp/3389 -N 192.168.10.1:3389 -s -k server
[+] Starting fwknop in client mode.
[+] Resolving hostname: server
[+] Enter an encryption key. This key must match key in the file
```

```
/etc/fwknop/access.conf on the remote system.
Encryption Key:
[+] Building encrypted single-packet authorization (SPA) message...
[+] Packet fields:
Random data: 7770617500218631
Username: mbr
Timestamp: 1138147120
Version: 0.9.6
Action: 2 (NAT access mode)
Access: 192.168.10.1,tcp/3389
MD5 sum: 1uUNjtZ042VPkFZ76HW+NA
[+] Sending 128 byte message to 10.10.10.1 over udp/62201...
```

Next, to attempt to establish an RDP connection and successfully login, we execute the "rdesktop" command: (this illustrates the transparent NAT access capability):

[client]$ rdesktop -u administrator server
Password:

Recall that the access.conf file on the fwknopd server 20 was configured to remove the packet filter access after ten seconds. This implies that if we Nmap-analyze the server 20 again from the client 10 after waiting 10 seconds we should not be able to detect that sshd is even listening (this can be done from a separate window on the client system so as to leave the existing SSH session intact). The Nmap output is as follows:

```
[client]# nmap -P0 -p 22 server
Starting nmap 3.83.DC13 ( http://www.insecure.org/nmap/ ) at 2006-01-24 18:55 EST
Interesting ports on server (10.10.10.1):
PORT STATE SERVICE
22/tcp filtered ssh
Nmap finished: 1 IP address (1 host up) scanned in 2.100 seconds
```

Note that the original session is still active because Netfilter is allowing packets that are part of the original established session through.

Thus, in the fwknopd server logfile we see the following messages have been generated as a result of receiving the valid SPA packet (note the timestamps which indicate that the firewall ACCEPT rule was indeed removed after 10 seconds):

```
Jan 24 19:14:56 server fwknopd: received valid Rijndael encrypted
packet from: 192.168.20.2, remote user: mbr
Jan 24 19:14:56 server fwknopd: adding FMKNOP_FORWARD ACCEPT rule for 192.168.20.2
-> 192.168.10.1 tcp/3389 (10 seconds)
Jan 24 19:15:07 server knoptm: removed iptables FWKNOP_FORWARD ACCEPT rule for
192.168.20.2 -> 192.168.10.1 tcp/3389, 10 second timeout exceeded
```

In the log messages above, "FWKNOP_FORWARD" refers to the custom Netfilter chain that is built by fwknopd as it runs. All dynamically created rules (with the exception of a jump rule in the Netfilter FORWARD chain) are added and deleted from this chain so as to always keep fwknopd rules separate from the existing Netfilter policy.

At this point we can be confident that the fwknop software is both generating SPA messages, encrypting/decrypting them via the symmetric Rijndael algorithm, monitoring them as they traverse the network, and modifying firewall rules to grant access to the desired service for a limited window of time.

After the client 10 has generated a successful SPA packet, the SPA server 20 provides transparent access to services that reside on other systems in the Cloud 30 (other than the SPA server 20) by employing Network Address Translation (NAT)

mapping. The source address in each packet is translated on the fly from a private address to the appropriate Cloud address. Specifically, the combination of IP and port information on the returned packet can be unambiguously mapped to the corresponding private VPC address and port information in Cloud 30.

The Cloud 30 maintains a NAT-enabled router with a range of unique routeable IP addresses (router ACL 32). One of these unique IP addresses is assigned to the fwknopd server system 20. At the same time, a non-routable IP is assigned to the Windows host. In addition, the fwknopd server also has NAT capabilities offered by iptables, and when fwknopd monitors a valid SPA packet that requests NAT access to the Windows host, it adds NAT rules for the corresponding incoming RDP connection.

This essentially creates an "SPA gateway" within the Cloud network 30 that is independent of any other border gateway devices that already exist within the Cloud provider itself. For example, as seen in FIG. 1, SPA is used to gain access from the SPA client system 10 to Windows® system 40 via Remote Desktop Protocol (RDP) through the Cloud 30 and its SPA gateway with dynamic creation of appropriate NAT firewall rules.

It should now be apparent that the enhanced method of Single Packet Authorization provides transparent access to software services resident on cloud 30-based servers, other than the host system 20 where the SPA server itself is running, by Single Packet Authorization (SPA). The core functionality of the present method is derived from four primary improvements:

1) Setting the default deny stance in a packet filter on all packets attempting to communicate with a protected service and allowing access only to proper SPA packets:

2) The specially constructed encrypted and non-replayable packet format, and dynamic reconfiguration of the packet filter to allow temporary access to an IP address (one time only);

3) The encrypted packet is passively monitored off the wire using the standard libpcap library commonly used in Intrusion Detection Systems.

4) the SPA server 20 replaces the destination IP of an incoming RDP connection with the non-routeable IP of the Windows host and manages a set of NAT rules to send this connection through the SPA server. The original destination IP from the client's perspective is that of the router ACL 32 which is also performing NAT in order to send packets to the fwknopd system.

One skilled in the art should understand that there are some features offered by fwknop that have not been explicitly demonstrated above, such as SPA packet spoofing, auto-resolution of external NAT address via external website, OpenSSH integration patch, and more. The basic functionality may be embellished to additionally incorporate any of the foregoing capabilities as well.

In all such cases it should be apparent that there is passive communication of authentication information from the client system 10 to the host system 20, with no return of data, and so anyone scanning the target system cannot tell that there is anything listening on the ports protected by the knock server. Moreover, the server side use of a packet filter intercepts all attempts to connect with the server that are not associated with a valid port knocking sequence. Consequently, even if an attacker possesses the host system's IP address, TCPs and UDP ports that serve as the door to the host system, it is all useless since a connection cannot even be established without first issuing a valid SPA packet. Finally, the non-replayable format of the particular SPA message disclosed herein provides the most robust security currently available.

Having now fully set forth the preferred embodiments and certain modifications of the concept underlying the present invention, various other embodiments as well as certain variations and modifications thereto may obviously occur to those skilled in the art upon becoming familiar with the underlying concept. It is to be understood, therefore, that the invention may be practiced otherwise than as specifically set forth herein.

What is claimed is:

1. A system for secure remote authorization of services within a Cloud computing network comprising:
   using a single packet authorization (SPA) server on a hardware host system that is also running a Network Address Translation (NAT)-enabled firewall in a default-drop stance, a SPA client on a client system connected to said Cloud computing network via a communications network, a NAT-enabled router in said Cloud computing network with an access control list of routable IP addresses in said Cloud computing network, and a formatted SPA packet sent from the client in order to gain access to services on the host;
   constructing by said SPA server, a NAT rule to translate an incoming SPA-authenticated connection to a specified non-routable internal IP address of said SPA server to allow certain predetermined packets;
   constructing, by said SPA client on said client system, an encrypted packet of access code comprising a non-routable IP address that is internal to the Cloud computing network, a plurality of bytes of random data and a hash function of the random data;
   sending, by said SPA client on said client system via said communications networks, said encrypted packet to the SPA server on said hardware host system;
   replacing, by said SPA server, the non-routable IP address in said encrypted packet with a routable IP address acquired from the access control list of routable IP addresses in said Cloud computing network to thereby allow access to said routable IP address if said encrypted packet matches a predetermined packet;
   constructing, by said SPA server, a NAT rule to translate the incoming SPA-authenticated connection to the specified non-routable internal IP address;
   storing, by said SPA server, the hash function of every allowed packet; and
   preventing, by said SPA server, access for any subsequently sent duplicate packets.

* * * * *